No. 701,827. Patented June 10, 1902.
G. H. ANDERSON, J. W. STEVENS & A. LUTZ.
SEWAGE DISPOSAL PLANT.
(Application filed Aug. 5, 1901.)
(No Model.) 5 Sheets—Sheet 3.
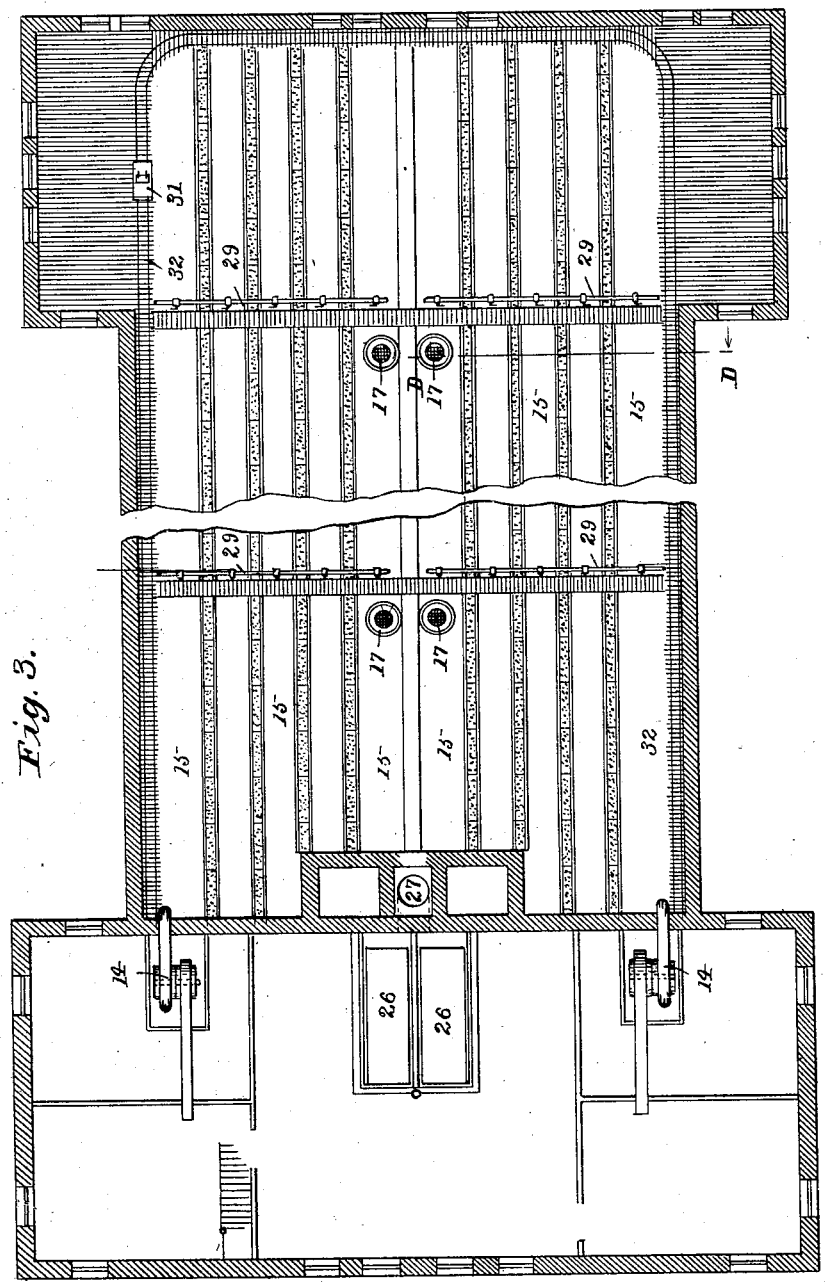
Witnesses
Ph. V. Devitt
Samuel C. Shaw
Inventors
George H. Anderson
John W. Stevens
and Alexander Lutz
By Chamberlain & Newman
Attorneys

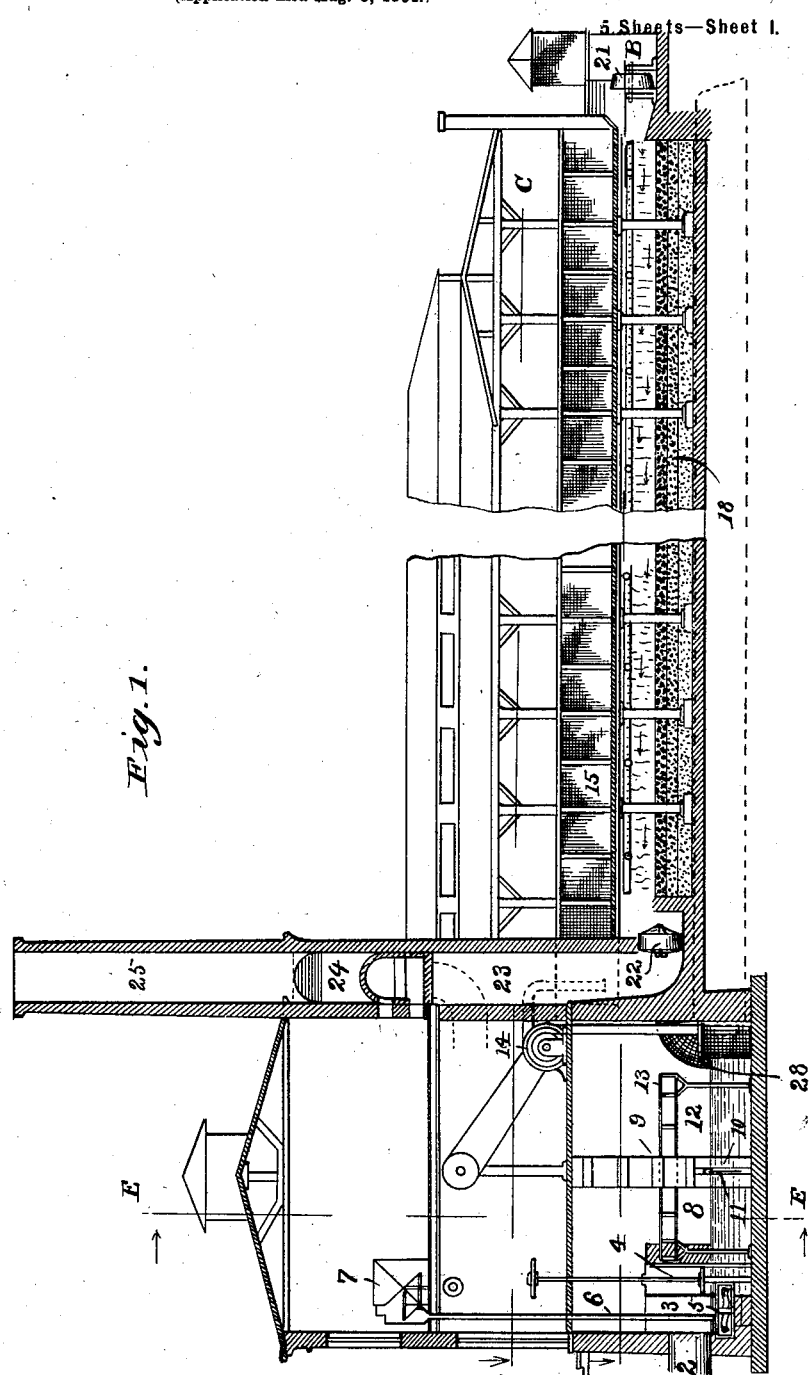

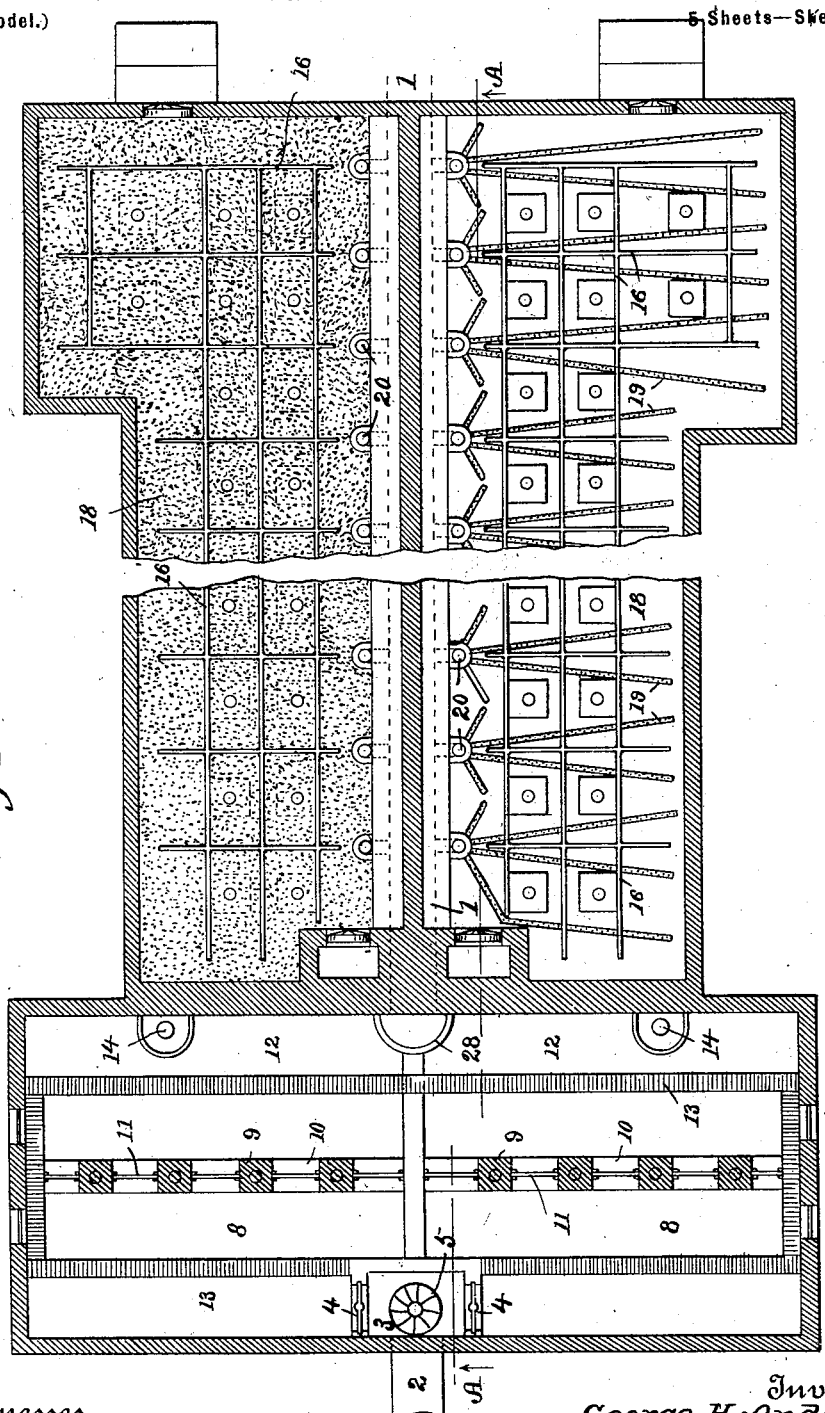

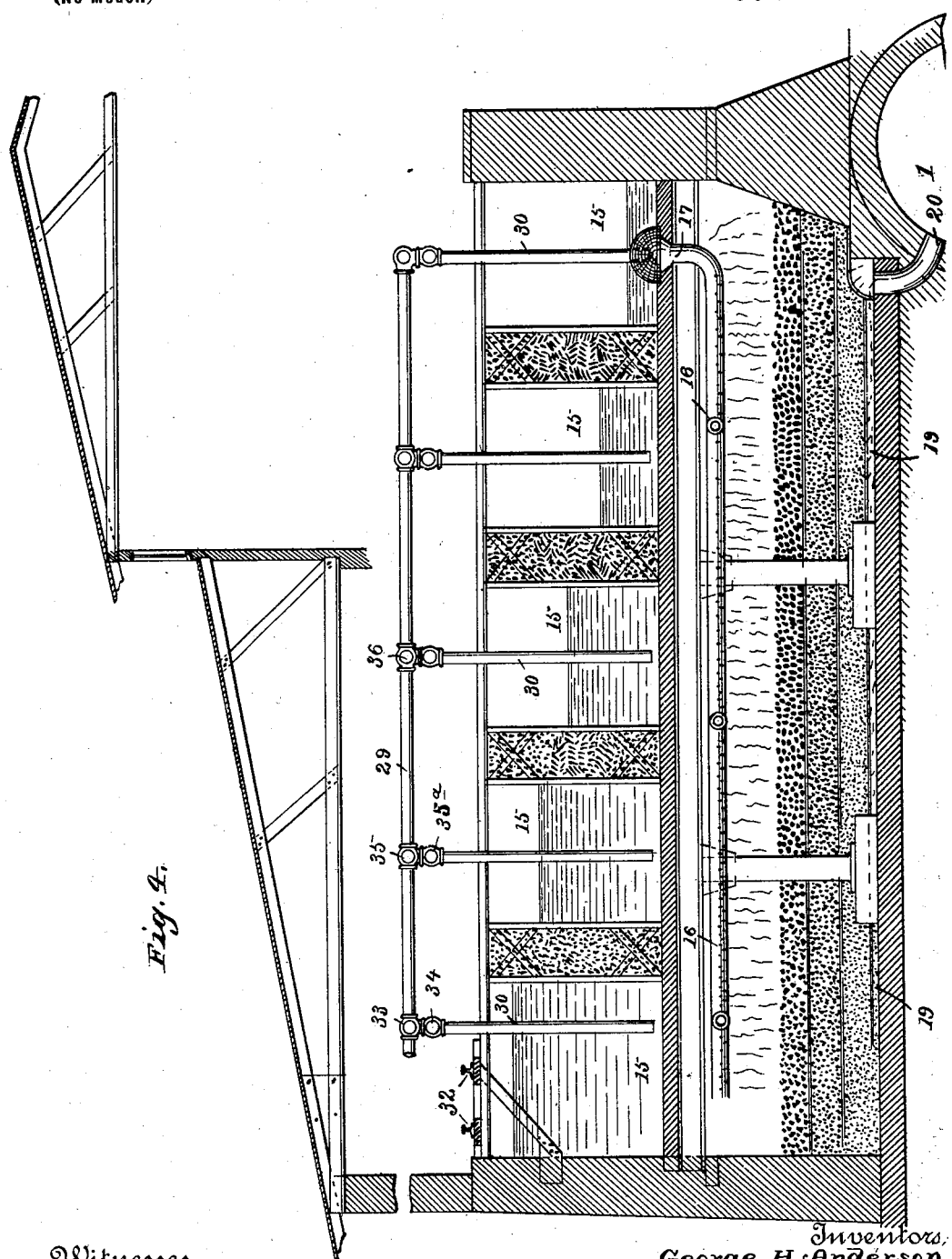

No. 701,827. Patented June 10, 1902.
G. H. ANDERSON, J. W. STEVENS & A. LUTZ.
SEWAGE DISPOSAL PLANT.
(Application filed Aug. 5, 1901.)
(No Model.) 5 Sheets—Sheet 5.
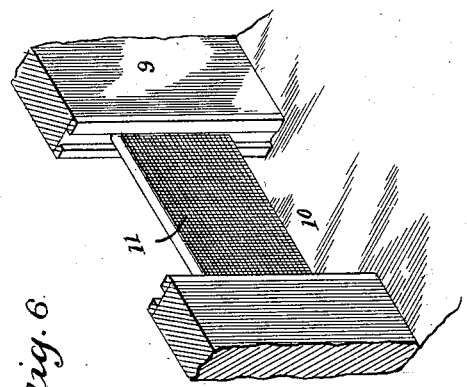
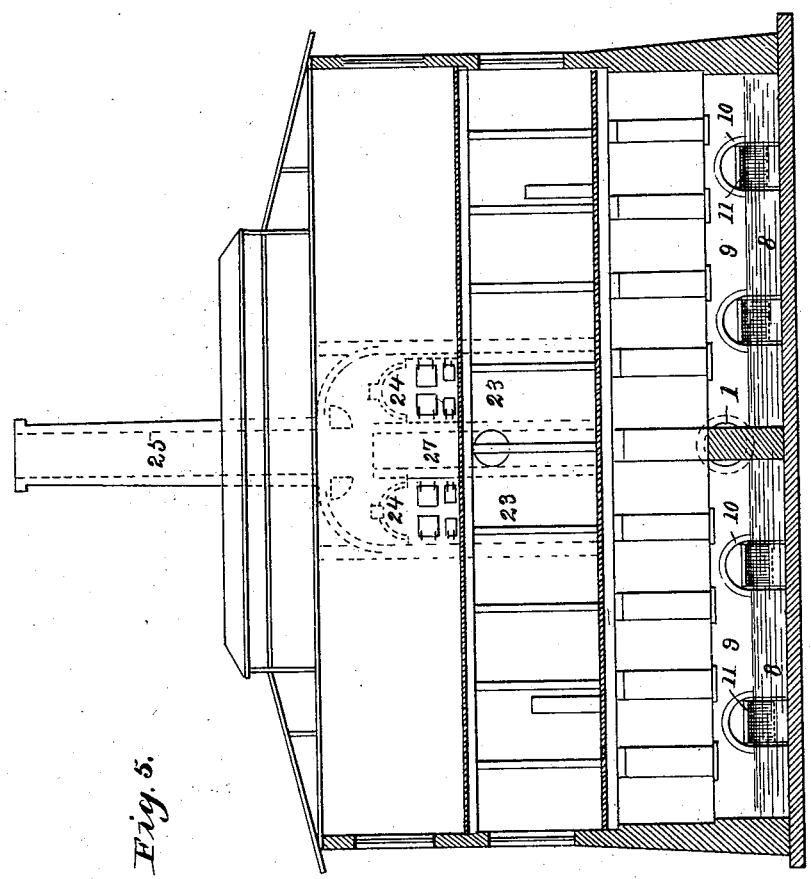
Witnesses
W. V. Devitt
Samuel C. Shaw
Inventors
George H. Anderson
John W. Stevens
and Alexander Lutz
By Chamberlain & Newman
Attorneys

UNITED STATES PATENT OFFICE.

GEORGE H. ANDERSON, JOHN W. STEVENS, AND ALEXANDER LUTZ, OF NEW YORK, N. Y., ASSIGNORS TO THE UNITED STATES SANITARY AND UTILITY SEWAGE DISPOSAL COMPANY OF NEW JERSEY, OF NEW YORK, N. Y.

SEWAGE-DISPOSAL PLANT.

SPECIFICATION forming part of Letters Patent No. 701,827, dated June 10, 1902.

Application filed August 5, 1901. Serial No. 70,860. (No model.)

*To all whom it may concern:*

Be it known that we, GEORGE H. ANDERSON, JOHN W. STEVENS, and ALEXANDER LUTZ, citizens of the United States, and residents of New York, in the county of New York and State of New York, have invented certain new and useful Improvements in Sewage-Disposal Plants, of which the following is a specification.

Our invention relates to new and useful improvements in sewage plants—such as are employed to receive, purify, and dispose of the sewage from cities, towns, or private institutions.

It is the object of our invention to provide a plant for the above purpose which shall be constructed on a scientific basis, being strictly sanitary in all respects and simple and inexpensive to operate; to provide a plant wherein all the heavy substances and impurities are separated from the liquid and destroyed; to further provide simple and improved means for cleaning out the settlement from the several receiving and filtering tanks.

In the operation of our plant the sewage is first mixed with a disinfectant, such as ground lime, next strained through a series of vertical filters, then thoroughly aerated, and finally filtered through horizontal filtering-beds, from which the effluent escapes in a cleansed and pure condition.

Our plant is preferably constructed in duplicate, so that one or both sections can be operated at will, thus enabling one section of the plant to be cleaned or repaired while the other section is in use.

With the above objects in view our invention resides and consists in the novel construction and arrangement of parts shown upon the accompanying five sheets of drawings, forming a part of this specification, upon which similar characters of reference denote like or corresponding parts throughout the several figures, and of which—

Figure 1 shows a longitudinal vertical section taken on line A A of Fig. 2. Fig. 2 is a horizontal sectional plan view taken on line B B of Fig. 1. Fig. 3 is a similar sectional plan view taken on line C C of Fig. 1. Fig. 4 is an enlarged detail cross-sectional view taken on line D D of Fig. 2 and illustrating but one part of the two sections shown in said drawing. Fig. 5 is a cross-sectional view taken on line E E of Fig. 1 and illustrating the two main tanks in which the sewage flows when entering the plant. Fig. 6 is a detail sectional perspective view of one of the floating screens through which the effluent passes in its preliminary operations.

As previously intimated, our plant is constructed in duplicate—that is to say, it is formed in two sections alike in construction and arranged side by side. In practice one or both of these sections may be operated at will, the intent, however, being to operate one while the other is idle, thus providing for repairs and cleansing, as is of course necessary in plants of this class. These sections are preferably constructed narrow in comparison with their length.

In the drawings we have shown the plant broken and the two ends brought together, thus omitting the duplication of the intermediate portion of the plant. This intermediate portion is the same throughout its entire length. Therefore the illustration shown can be read and considered as if the break did not appear. In practice the length and size of this plant would of course vary in accordance with the amount of sewage to be handled.

In view of the fact that the two sections of the plant are alike in construction we deem it necessary to describe in detail only one section, but will place the same reference characters upon the corresponding parts of both sections, thus shortening and simplifying the same.

The building, as will be seen, is constructed substantially, being of a general rectangular shape with enlargements at either end, one of which forms the front and main part of the building, wherein the boilers, furnaces, lime-mill, and other machinery are located, while the other end affords storage-room. A central longitudinal wall through the building divides the plant in two sections, and a single outlet-sewer 1, situated beneath this wall, serves to receive the effluent from either section and convey it off in a purified state.

Referring in detail to the characters of reference marked upon the drawings, 2 represents the main or inlet sewer, which delivers the sewage to the plant, said sewage being discharged into a mixer-chamber 3, having a gate 4 at either side thereof, one gate serving to control the flow into one section of the plant while the other gate controls it to the section upon the opposite side. Within this chamber is located an agitator 5, arranged to run horizontally, constructed of steel and cast-iron with proper disks and wings to be driven by the weight of the inflow of sewage and may be arranged to be removed in case of heavy or unusual flow of storm-water. Adjacent to this agitator (see Fig. 1) is located a vertical feed-pipe 6, which serves to convey ground lime into the mixing-chamber from a suitable mill or hopper 7, located on the third floor of the main building, thereby providing a continuous supply of ground lime to the sewage as it is received in the plant and thoroughly mixing said lime with the effluent in order to disinfect the same. From the mixing-chamber the sewage is delivered to either of the sections of the plant through one of the gates 4, before mentioned, said sewage first entering the tanks 8. This tank is provided with a transverse partition 9, having a series of openings 10 therethrough, one of which is provided with a self-adjustable or floating screen 11, as clearly appears in Fig. 6. These screens are slidably mounted in suitable ways at either side of the opening and in practice are made light, so as to insure their floating in the effluent in a manner to be partly submerged, yet projecting above said effluent sufficiently to strain the upper part of the same as it passes through into the adjoining tank 12, located at the rear of the first-named tank. Above this tank is located a suitable walkway 13, whereby an attendant may inspect the condition of flow and have access to the tanks for the purpose of skimming from the effluent therein such matter as appears and collects upon the surface in front of the several screens.

If the conditions and location of the plant are not such that the system may be worked by gravity, we reserve the right to employ pumps, such as are shown in the drawings, for the purpose of raising the effluent from the tank 12 to the vertical filterers, as will now be described.

Upon the second floor of the main building is located a pump 14, having connections with the tank 12, whereby the effluent therein is raised and discharged into the longitudinal tank 15, forming the first of a series of vertical filters, of which there may be any number, four being shown on the drawings. These several tanks 15 are longitudinally divided one from the other by means of suitable vertical filters constructed of wire screen on two sides and filled in with suitable filtering material, thus permitting the effluent to pass therethrough and insuring the settlement of the sludge to the bottom of the tanks by its own gravity. As the effluent reaches the last or inner tank adjacent to the division-wall of the building it is largely freed of its thickest matter and is drained from this tank through a series of pipes 16 and next aerated, the construction for which will next be described.

Referring to Sheets 1, 2, and 4, it will be seen that we have arranged a series of piping 16, which in practice is supported on the girders of and beneath the floor of the vertical filtering-beds before mentioned and provided with pipe connections 17 at given distances apart with the last of the series of vertical filters. The effluent is thus taken from the filters and conveyed throughout the several sections of the piping 16 for distribution upon the horizontal filtering-bed 18 beneath. This system of piping is provided with suitable perforations arranged at proper distances apart, either through the sides or bottom of the pipe, as we may elect, and whereby the water is discharged in very fine streams, as will be obviously apparent. As the effluent passes from the piping to the horizontal filtering-bed it is aerated by a system of blowers, which will again be referred to. This effluent is delivered to the horizontal filtering-bed, passing through its several strata of gravel and other filtering material, and eventually settles to the bottom, which may be formed upon a slight incline and provided with suitable series of transverse terra-cotta perforated piping 19, formed in half-round sections laid with their open sides down against the bottom (see Fig. 2) and leading to the discharge-pipe 20 to the outlet-sewer 1. There may of course be any number of series of these drain-pipes located at proper distances apart and likewise any number of outlet-pipes, said quantity being determined by the size and length of the plant employed.

The aerating-chamber before mentioned is closed upon all sides except its two ends, in the outer one of which is located a blower 21, while the inner end is provided with a second suction-blower 22. The first of these blowers serves to draw in fresh air from the exterior, while the second one serves to draw the foul air from the horizontal filtering-bed and force it up into the flue 23, from which it is conveyed through a retort 24 and burned, thus destroying all offensive germs which it contains. In practice the effect of these blowers is to send a current of air through the sprays of water as it falls, thus thoroughly aerating the same and insuring the complete changing of air within the chamber at least once in two hours.

25 represents a chimney the lower portion of which contains the two air-inducts 23 before mentioned, each of which is connected with one of the aerating-chambers, and thus serves to convey the foul air therefrom through the retorts 24. Adjacent to the chimney and inducts in question, and preferably on the second floor of the main building, are located furnaces and boilers 26, which are connected with the central flue 27 intermediate of the two air-inducts 23. These furnaces and boilers are used to generate the steam and electricity used for power throughout the building, and the furnaces are also used to consume the heavy particles of sewage which is taken from the tanks 8 and 12. This heavy substance is both skimmed from the top of the effluent and removed from the bottom of the tanks when emptied, after which the said material is squeezed out under heavy pressure and then mixed with a proper percentage of coal, and thus consumed.

The outlet-sewer 1, situated beneath the division-wall of the building, not only serves to drain the filtering-beds of the purified effluent, but also takes off excessive flows of storm-water without it passing through the filtering-beds. This is accomplished by reason of said outlet-sewer extending forward and connected with the tanks 12 of the two sections and being provided with an overflow-wall 28, which is but a few feet in height and adapted to be overflown when the effluent in either of said tanks rises above said wall. In ordinary operations of the plant the pumps in question are designed to keep the effluent down sufficiently so that it will not rise above this wall 28, consequently preventing any escape of the sewage therethrough; but with the excessive flow, such as would be caused by a heavy rain, the pumps would be stopped and the entire flow of water allowed to pass over this guard-wall into the outlet-sewer.

With the continual operation of the plant more or less settlement in the form of sludge finds its way to the bottom of the several tanks 15 and necessarily has to be removed, which is done when the section is idle. We therefore provide a convenient method of removing this sludge from these tanks by power, which consists in first providing several sections 29 of piping at suitable distances apart, as is clearly shown in Figs. 3 and 4. Each of these sections comprises a transverse line of piping, with a depending section 30 for each tank, with suitable valve connections controlling the openings through the same. The outer end of this transverse pipe is open and adapted for the attachment of a suction-hose, which would form a part of a direct electrical centrifugal pump 31, located upon a car mounted upon a track 32. This track, as will be seen from Fig. 3, extends around the interior of the building adjacent to the outer wall and in line with the open ends of the several sections of piping referred to, thus making it possible to move the pump from one section to another, attach one end of a hose, and deflecting the opposite end into an adjoining empty car (not shown) or out through a window into a cart or other vehicle for removal.

In practice the method of pumping up the sludge from the several tanks would consist first of attaching the pump to the open end of the pipe in the manner previously suggested and then opening the first two valves 33 and 34 of the section (see Fig. 4) and closing the valve 35, whereupon the action of the pump of course would be to draw through the first depending member 30 of the section in a manner to remove the mud and sand therefrom. After this tank has been cleaned the valve in this depending member would be closed, while the valves 35 and 35ª would be opened and valve 36 closed. This would give a direct line of suction to the second tank, which would be emptied in the same manner as the one previously described, after which the operations would be repeated in the cleaning of the entire series of tanks.

Having thus described our invention, what we claim as new, and desire to secure by Letters Patent, is—

1. In a sewage plant, the combination of a series of vertical filters and tanks arranged side by side so that the effluent drains sidewise from one to the other, a series of pipes adapted to drain the final tank of said series of filters, suitable spraying attachments for distributing said drainage, means for aerating said spray consisting of blowers for driving in the pure air and drawing out the foul air from said spraying-chamber and means for burning the germs in said air as it comes through the spray.

2. In a sewage plant, the combination with a series of suitable vertical filtering devices arranged side by side, drain-pipes therefor provided with branch pipes and spraying attachments to distribute and aerate the effluent as it is drained from the filters, a chamber in which said spraying is effected, a blower at either end of said chamber for forcing air in and out, for the purpose of aerating the effluent, and a retort for destroying the germs in the air that come from said chamber, substantially as described.

3. The combination in a sewage plant, of a series of tanks and filters intermediate of said tanks, the whole arranged to insure the drainage of effluent from one to the other, connections for draining the last of said series, a system of perforated piping connected with said drainage adapted to finely distribute said effluent on a large area of surface, means for thoroughly aerating said distributed water as it falls from the pipe, a filtering-bed through which said water flows and perforated drains beneath said bed to convey the water therefrom.

4. In a sewage plant the combination with a filtering and settlement tank, of a series of fixed suction-pipes located therein, a track extending around said tank and portable pump mounted upon said track adapted to be successively connected with each of said suction-pipes, substantially as described.

5. In a sewage plant, the combination with a series of settlement-tanks arranged adjacent to each other, filters intermediate of said tanks to permit the effluent to drain from one to the other, a stationary main suction-pipe extended across said tanks, branch pipes extended into each tank from said main pipe, valves for cutting out any or all of said branch pipes and a pump for said pipes.

6. In a sewage plant the combination with a series of filtering-tanks for containing sewage and arranged side by side, of means for removing the sludge therefrom consisting of a series of transverse pipes extending across said series and having depending members for each section with suitable valves for opening and closing the several parts thereof and a portable pump adapted to be connected with either of said pipes to draw up said sludge and convey it to a suitable receptacle.

7. In a sewage plant, the combination with a series of tanks for containing sewage arranged adjacent to each other and filters intermediate of said tanks, of means for removing the sludge therefrom consisting of stationary sections of piping covering adjoining parts of the tanks, branch pipes on each of said sections, valves for opening and closing the several branches in said sections, a track adjacent to the tanks and a portable pump located upon the track adapted to be moved from one section of piping to another for attachment therewith to remove the sludge from the tanks through said sections and discharge it into any suitable vehicle.

8. In a sewage plant the combination with a receiving-tank, of a second tank adjacent thereto, one or more screens dividing said tank, the same adapted to fit in suitable ways and to float with the effluent in a manner to retard the light substances in said effluent, substantially as shown and described.

9. In a sewage plant, the combination with a receiving-chamber, of a mixing-wheel located therein adapted to receive the inflow from the sewer, means for grinding and feeding lime or some other suitable disinfectant thereto, tanks arranged adjacent to said mixing-chamber, valves for controlling the flow of sewage from said chamber to each of said tanks, a series of vertically-arranged tanks and filters and means for raising the effluent from the first-named tanks.

10. In a sewage plant, the combination with receiving-tanks, of a pump adapted to raise the effluent therefrom, a series of vertical tanks and filters through which the effluent is passed, blowers for purifying the effluent as it comes from said vertical filters and a retort to receive and burn the air as it comes from the blowers, a horizontal filtering-bed upon which said effluent is finely distributed during aeration.

11. In a sewage plant of the class described, the combination with a receiving-tank, a series of vertical filters located side by side, means for feeding the water from the tank to the filters, a storm-sewer connected with the tank adapted to receive the effluent therefrom after it reaches a given height, a drain-pipe for said vertical filters with perforations for distributing and aerating the water as it comes from said filters, a final horizontal filtering-bed through which said effluent passes, and drains for said bed connected with the storm-sewer adapted to receive the purified water.

Signed at New York city, in the county of New York and State of New York, this 1st day of August, A. D. 1901.

GEORGE H. ANDERSON.
JOHN W. STEVENS.
ALEXANDER LUTZ.

Witnesses:
J. HARRY NICHOLSON,
L. E. HICKS.